(12) United States Patent
Wang et al.

(10) Patent No.: US 10,442,946 B2
(45) Date of Patent: Oct. 15, 2019

(54) WATER-BASED CONDUCTIVE INK FOR RAPID PROTOTYPE IN WRITABLE ELECTRONICS

(71) Applicant: Nano and Advanced Materials Institute Limited, Hong Kong (HK)

(72) Inventors: Yuechen Wang, Hong Kong (HK); Tao Xu, Hong Kong (HK); Li Fu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 8 days.

(21) Appl. No.: 15/901,916

(22) Filed: Feb. 22, 2018

(65) Prior Publication Data

US 2018/0282566 A1    Oct. 4, 2018

Related U.S. Application Data

(60) Provisional application No. 62/601,802, filed on Apr. 3, 2017.

(51) Int. Cl.

| | | |
|---|---|---|
| *C09D 11/52* | (2014.01) | |
| *C09D 11/16* | (2014.01) | |
| *C09D 11/17* | (2014.01) | |
| *B41M 5/00* | (2006.01) | |
| *B41M 7/00* | (2006.01) | |

(52) U.S. Cl.
CPC .......... *C09D 11/52* (2013.01); *B41M 5/0023* (2013.01); *B41M 7/009* (2013.01); *C09D 11/16* (2013.01); *C09D 11/17* (2013.01)

(58) Field of Classification Search
None
See application file for complete search history.

(56) References Cited

U.S. PATENT DOCUMENTS

| | | | |
|---|---|---|---|
| 5,013,361 | A | 5/1991 | Case et al. |
| 5,474,603 | A | 12/1995 | Miyashita et al. |
| (Continued) | | | |

FOREIGN PATENT DOCUMENTS

| | | |
|---|---|---|
| CN | 102504647 A | 6/2012 |
| CN | 101624490 B | 10/2012 |
| CN | 103073953 A | 5/2013 |
| CN | 105348923 A | 2/2016 |
| (Continued) | | |

OTHER PUBLICATIONS

English translation of CN 103073953, May 2013; 12 pages.*

(Continued)

*Primary Examiner* — Helene Klemanski

(57) ABSTRACT

The present application describes a composition and method thereof to make low cost environment friendly and highly safe conducive ink by using micro-sized silver particles, water, edible level thickener, water-based solvent, water-based resin and surfactant. The conductive ink may be written by various kinds of writing devices like gel pen, ball pen etc. on various substrates like paper, plastic, metal, etc. form a conductive trace. As additional features of the present application, the composition comprises erasable conductive ink, which is fast curing and conductive immediately upon application, having multiple applications for educational purpose to help students have a better understanding of how electronic work and even design their own electronics conveniently.

17 Claims, 2 Drawing Sheets

(56) References Cited

U.S. PATENT DOCUMENTS

| | | |
|---|---|---|
| 6,299,376 B1 | 10/2001 | Nakatani |
| 6,706,103 B2 | 3/2004 | Yoshimura et al. |
| 7,566,360 B2 | 7/2009 | Garbar et al. |
| 8,709,289 B2 | 4/2014 | Rouse et al. |
| 2003/0185971 A1 | 10/2003 | Saksa et al. |
| 2004/0080593 A1* | 4/2004 | Wotton ............ B41M 7/009 347/100 |
| 2009/0263496 A1* | 10/2009 | Kijlstra ............ C09D 11/52 424/600 |
| 2010/0009153 A1 | 1/2010 | Yang et al. |
| 2012/0061623 A1* | 3/2012 | Foreman ............ C09D 11/52 252/513 |
| 2015/0166810 A1* | 6/2015 | Fu ............ C09D 11/322 427/559 |
| 2017/0253751 A1* | 9/2017 | Busbee ............ C09D 11/52 |

FOREIGN PATENT DOCUMENTS

| | | |
|---|---|---|
| EP | 1260564 A1 | 11/2002 |
| EP | 1411094 A1 | 4/2004 |
| WO | 2015/183679 A1 | 12/2015 |
| WO | 2017026717 A2 | 2/2017 |

OTHER PUBLICATIONS

English translation of CN 105348923, Feb. 2016; 5 pages.*
English translation of CN 101624490, Oct. 2012; 11 pages.*
English translation of WO 2017/026717, Feb. 2017; 18 pages.*
Search Report of counterpart European Patent Application No. 18157848.5 dated May 4, 2018.
Analisa Russo et al., Pen-on-Paper Flexible Electronics, Advanced Materials, 2011, 23, pp. 3426-3430.

* cited by examiner

WATER-BASED CONDUCTIVE INK FOR RAPID PROTOTYPE IN WRITABLE ELECTRONICS

CROSS-REFERENCE TO RELATED APPLICATIONS AND PRIORITY

The present application claims priority from U.S. Provisional Patent Application No. 62/601,802 dated Apr. 3, 2017, the entirety of which is incorporated herein by a reference.

TECHNICAL FIELD

The present application relates to a water-based metallic ink composition and printed electronics on flexible substrates.

BACKGROUND

Printed electronics is one of the fastest growing technologies in the world. It makes much more possibilities to kinds of industries such as consumer goods, healthcare, aerospace, electronics, media and transit. It allows electronics to be used in field of it has never been before and improving existing electronic products and electrics. It is specifically a set of printing methods used to create electrical devices on various substrates. Printing typically uses common printing equipment suitable for defining patterns on materials, such as screen printing, flexography, gravure, offset lithography, and inkjet printing. The printed electronics offer an attractive alternative to conventional technologies by enabling creation of large-area, flexible devices at a low cost. There is a plethora of applications for high-conductivity materials with fine-scale features in modern electronics such as solar cell electrodes, flexible displays, radio frequency identification tags, antennas, etc. The printed electronics are expected to facilitate widespread, very low-cost, low-performance electronics for applications such as flexible displays, smart labels, decorative and animated posters, and active clothing that do not require high performance. For the preparation of printed electronics, nearly all industrial printing methods can be employed. Similar to conventional printing, printed electronics apply ink layers one atop another. So, the coherent development of printing methods and ink materials are the field's essential tasks.

Recent attention has focused on flexible substrates as a low-cost, enabling platform for portable, lightweight, and disposable devices. Such devices require conductive electrodes, which, to date, have been deposited by screen printing, sputter coating, inkjet printing, and airbrush spraying. However, these deposition methods involve use of an ink which may not be convenient in fast prototypes due to complicated curing methods and consequently no ink in the present state of art is immediately conductive after writing.

Flexible substrates offer many advantages for printed electronic devices. Not only are flexible substrates widely available and much more convenient, they are lightweight, biodegradable, and can be rolled or folded into three-dimensional (3D) configurations. Functional electronic components, including thermochromic displays, disposable radio frequency identification (RFID) tags, and cellulose-based batteries have recently been produced on flexible substrates. The wide variety of flexible substrates such as polyethylene terephthalate (PET), polyimide (PI), paper substrates etc., and coatings can be exploited to enable specific device architectures. Facile routes to creating devices with inks which are immediately conductive upon writing under ambient conditions could make it possible to fully exploit the potential of flexible printed electronics.

In the present state of art, various technologies are known which produce conductive ink, particularly silver-based conductive inks for writing on a plurality of substrates. However, these inks face numerous technical issues. Firstly, the inks or pastes normally require printing equipment to form patterns and require curing at high temperature to achieve reasonable conductivity for the printed trace. Thus, it is not suitable for a product with writable pen shape to be used for the application in fast prototyping and educational toy industry. Secondly, the drying/curing time for such inks is long and the ink is not immediately conductive upon printing. Thirdly, many such inks contain nanoparticles which require high curing temperature, have much limitation on the products and reduce their large-scale availability. Lastly, the conductive trace formed is hard to be modified after print-out by the conductive inks available in the present art. It is not convenient for electronic engineers doing fast prototyping.

SUMMARY

This summary is provided to introduce aspects related to development of a composition and method of formation thereof for a conductive ink and method for forming a conductive trace on a plurality of substrates. This summary is however not intended to disclose essential features of the innovation and nor is intended to determine, limit or restrict the scope of the innovation.

The present application relates to a water-based, low-cost conductive ink comprising micro-sized conductive metallic particles for formation of a metallic trace on a plurality of substrates to be used in the field of printed electronics.

According to the present application, a water-based conductive ink is disclosed having at least micro sized particles with little or no drying time and which forms a conductive trace immediately upon writing which is prepared in a suitable solvent and binders such that it can be smoothly dispensed by gel pen and may be adjusted from erasable to inerasable.

In accordance with one aspect of the application, the features of a composition for a conductive ink are disclosed, said composition comprising a solvent; conductive particles free from any nanoparticles, wherein the conductive particles further comprise one or more metals; an edible thickener; a surfactant; water in the range of 30%-60% weight by weight of the composition; and optionally a dispersant comprising a water-based resin having concentration in a range of 1% to less than 5% weight by weight of the composition.

In accordance with another aspect of the present application, the features of a composition for a conductive ink are disclosed, wherein said conductive particles comprise one or more of silver, copper, gold, carbon or any other conductive metal alloy particles, and wherein the conductive particles have a size in a range of 1 to 15 micrometers and are further added at a concentration in a range of 15% to 50% weight by weight of the composition.

In accordance with one aspect of the present application, the features of formation of a conductive trace are disclosed, wherein the conductive trace is formed by: providing a water-based conductive ink in a writing device, said ink comprising, a solvent, conductive particles comprising one or more metals, an edible thickener, a surfactant, water in the range of 30%-60% weight by weight of the composition, and optionally a dispersant comprising a water-based resin having concentration in a range of 1% to less than 5% weight by weight of the composition; moving said writing device over a surface comprising one or more substrates; and drying said ink at room temperature for a time period not exceeding 30 seconds thereby forming a conductive trace on the surface.

In accordance with another aspect of the present application, features of a conductive trace are disclosed, wherein the resistivity of said conductive trace written by writing devices is in the range of 0.5 to 30 Ω·cm depending on different substrates and wherein said conductive trace can load at least 6 A current flow depending on different substrates.

In accordance with still another aspect of the present application, features of a conductive trace are disclosed, wherein the conductive trace can be converted from erasable to inerasable by adjusting the amount of said water-based resin.

In accordance with one aspect of the present application, features of a method for formation of a conductive trace, are disclosed, said method comprising a first step of providing a water-based conductive ink in a writing device, said ink comprising a solvent, conductive particles comprising one or more metals having a size in the range of 1 to 15 micrometers and at a concentration in the range of 15% to 50% weight by weight of said ink composition, a surfactant, and water in the range of 30%-60% weight by weight of the composition, an edible thickener, and optionally a dispersant comprising a water-based resin having concentration in a range of 1% to less than 5% weight by weight of the composition; a second step of moving said writing device over a surface comprising one or more substrates; and, a third step of drying said ink at room temperature for a time period not exceeding 30 seconds thereby forming a conductive trace, wherein the conductive trace is immediately conductive upon writing on the surface without requiring high temperature curing for becoming conductive.

In accordance with another aspect of the present application, features of the method of formation of conductive trace are disclosed, wherein the substrate includes but is not limited to, copy paper, photo paper, PET, flexible printed circuit (FPC), bulk plastic, or metal substrate.

BRIEF DESCRIPTION OF THE DRAWINGS

The detailed description is given with reference to the accompanying FIGURE. In the FIGURE, the left-most digit(s) of a reference number identifies the FIGURE in which the reference number first appears. The same numbers are used throughout the drawings to refer like features and components.

Figure 1A:
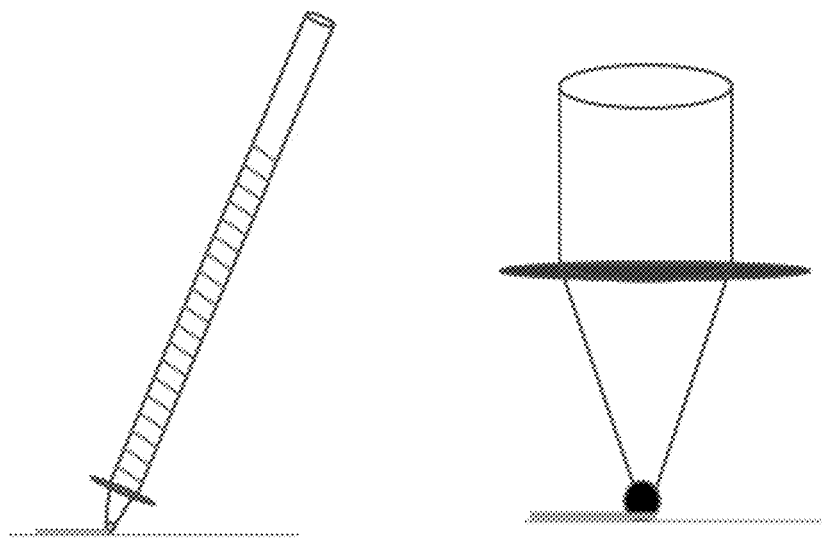
FIG. 1A illustrates conductive silver ink filled into a gel pen or any other writing devices which can smoothly writing on kinds of substrates, in accordance with an embodiment of the present application.

The figures depict embodiments of the present disclosure for purposes of illustration only. One skilled in the art will readily recognize from the following description that alternative embodiments of the steps illustrated herein may be employed without departing from the principles of the disclosure described herein.

DETAILED DESCRIPTION

The foregoing detailed description of embodiments is better understood when read in conjunction with the appended drawings. For the purpose of illustrating the disclosure, there are shown in the present document example constructions of the disclosure; however, the disclosure is not limited to the specific design disclosed in the document and the drawings.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise.

The exemplary embodiments described herein and claimed hereafter may be suitably practiced in the absence of any recited feature, element or step that is, or is not, specifically disclosed herein. For instance, references in this written description to "one embodiment," "an embodiment," "an example embodiment," and the like, indicate that the embodiment described can include a particular feature, structure, or characteristic, but every embodiment may not necessarily include the particular feature, structure, or characteristic. The disclosed embodiments are merely exemplary of various forms or combinations. Moreover, such phrases are not necessarily referring to some embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

No terminology in this application should be construed as indicating any non-claimed element as essential or critical. The use of any and all examples, or example language (e.g., "such as") provided herein, is intended merely to better illuminate example embodiments and does not pose a limitation on the scope of the claims appended hereto unless otherwise claimed.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range. For example, a range of "about 0.1% to about 5%" or "about 0.1% to 5%" may be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The present application relates to compositions of a conductive ink and methods of formation of a conductive trace which is water-based, environment friendly, low-cost and comprising of micro-conductive particles to form a conductive trace on suitable substrate to be used in one or more applications of conductive electronic instruments particularly in the toy and education industries. It is a further feature of the present application to produce said conductive ink and said conductive trace in an easily writable form without requiring any additional curing time and cost.

Figure 1B:
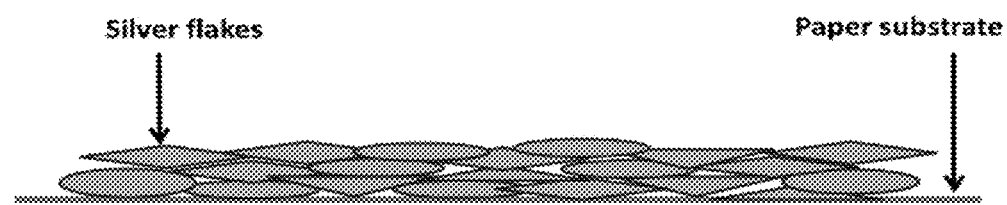
FIG. 1B illustrates percolated conductive trace written on the substrate, in accordance with an embodiment of the present application.
Figure 1C:
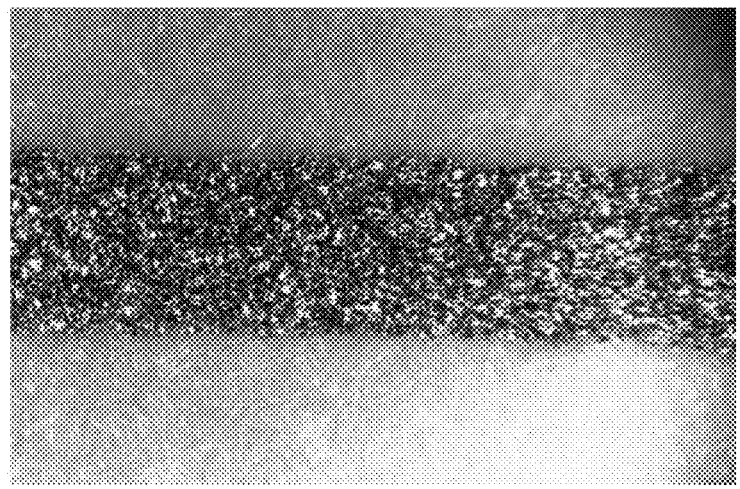
FIG. 1C illustrates conductive trace on a paper substrate as observed under an optical microscope in accordance with an embodiment of the present application.
Figure 1D:
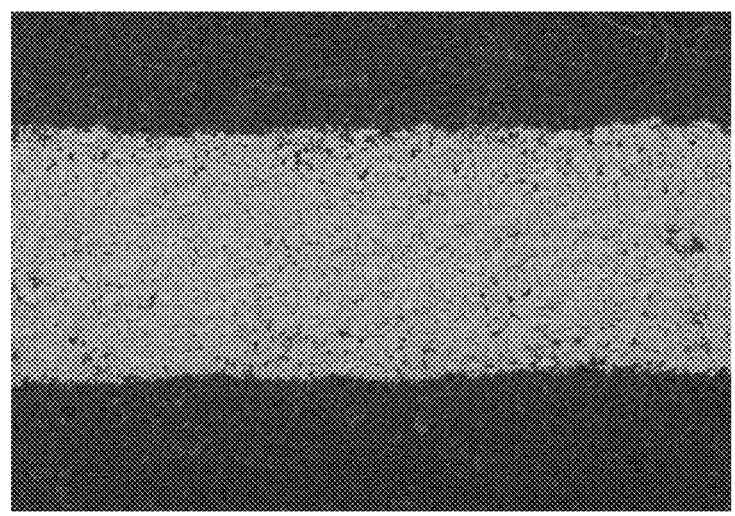
FIG. 1D illustrates Scanning Electron microscope image of a conductive trace on a paper substrate with an embodiment of the present application.

Referring now to FIG. 1, a water-based conductive silver ink for kinds of writing devices including but not limited to gel pen, ball point pen, ink pen and brushes (FIG. 1A) is illustrated for writing on suitable portable substrates including but not limited to copy paper, photo paper, card paper, PET, flexible printed circuit (FPC), plastic or even some of metal alloy surface to form a conductive trace comprising metal microparticles (FIG. 1B). The conductive trace so formed has a metallic appearance upon writing and can be characterized by optical microscopy as well as scanning electron microscopy as can be seen in FIG. 1C and FIG. 1D respectively.

In one embodiment, the present application may relate to composition of a conductive ink to form conductive trace on a desired substrate to be employed in the toy industry and the education industry. The substrate of choice for such a writable conductive ink may preferably be paper substrates.

In one embodiment, the present application may relate to composition of a conductive ink to form a conductive trace on a substrate including but not limited to portable substrates like copy paper, photo paper, card paper, PET, FPC, plastic or even some of metal alloy surface or any combination thereof.

In another embodiment, the present application may relate to composition of a conductive ink to form a conductive trace on a paper substrate which can be incorporated and used in a suitable writing device including but not limited to gel pen, ball point pen, ink pen and brushes.

In an embodiment, the present application may relate to formation of water-based conductive ink for forming a conductive trace on a suitable substrate. The conductive ink may comprise of conductive particles in an amount in the range of 15% to 50% weight by weight and may comprise one or more metals selected from the transition metals, the metalloids, and/or some other metallic oxides and may be selected from the group consisting of: Al, Ti, Mn, Fe, Co, Ni, Cu, Zn, Mo, Pd, Ag, In, Sn, Sb, W, Pt, and Au etc., common used metal and $TiO_2$, $Fe_3O_4$, $Cu_2O$, ZnO, SnO, InO, etc.

In another embodiment, the present application may relate to a conductive ink composition for forming conductive trace on a suitable substrate comprising conductive particles selected preferably from one or more metals including Ag, Au, Cu, Ni, Pt, and/or Pd. The conductive particles may comprise substantially pure metals containing only incidental impurities, metal alloys, and/or metal oxides (e.g., tin oxide or indium-tin oxide). It is also contemplated that the conductive particles may include a coating (e.g., a conductive coating or a passivation layer) on individual flakes and/or particles. The coating may include one or more of the metals mentioned above.

In an exemplary embodiment, the present application may relate to a conductive ink composition for forming conductive trace on a suitable substrate comprising conductive particles which are silver flakes. Fine silver flake is particularly desirable to establish a percolated network with each other to realize a conductive trace on 2D platform. The silver flakes may be present in said conductive ink at a concentration of 15% to 50% weight by weight, preferably at a concentration of 15% to 35% weight by weight, more preferably at a concentration of 15% to 30% weight by weight and more preferably at a concentration of 15% to 25% weight by weight. When the amount is below 15% by weight, the percolated network is too thin to form a conductive trace, a very high resistivity or no response will be detected to the writing trace and, on the contrary, If silver exceeds 50% by weight, the viscosity of the ink increases significantly due to the high solid content, not allowing smooth trace writing on the desired substrate because of the poor fluidity of the system leading to silver sedimentation.

In still another embodiment, the silver flake used in the conductive ink formation comprise of micro particles in the size range of 1 to 15 μm, preferably in the size range of 3 to 15 μm and more preferably in the size range of 9 to 15 μm. When the size is lower than 1 μm, the trace written will be barely conductive because of the poor percolation effect. When the size is above 15 μm, the powder can hardly come out of the writing device and will result in serious sedimentation in the ink.

In one embodiment, the present application may relate to composition of conductive ink for forming conductive trace on a paper substrate, said composition may additionally comprise of a suitable solvent which may preferably be a water-based organic solvent for the purposes of improving the qualities of the ink for a writing device. The water-based solvent may prevent the ink from drying at the pen point, from freezing at a low temperature and may prevent from lower dry speed on the paper substrate. Non-limiting examples of water-based organic solvents include glycols such as ethylene glycol, diethylene glycol, and triethylene glycol, propanols such as 2-propanol, and methoxy-propanol, ethers such as ethylene glycol monomethyl ether, triethylene glycol monomethyl ether, and propylene glycol monomethyl ether, and acetates such as methyl acetate, ethyl acetate, and butyl acetate. They are used either individually or in the form of a mixture of two or more of solvent. The amount of such solvent is preferably less than 10%, more preferably less than 20% and even more preferably less than 30% by weight based on the total amount of the ink.

In one embodiment, the present application may relate to composition of conductive ink for forming conductive trace on a paper substrate wherein the conductive ink composition may additionally comprise a dispersant comprising a water-based resin to assist in the dispersion of said conductive particles in said solvent. The water-based resin used in the formulation may be the key component enabling the inter-conversion of said conductive ink from erasable/removable to non-removable or inerasable. The concentration of the water-based resin may be increased when silver ink is required to be non-erasable and may be decreased to make the ink erasable, i.e. said water-based resin composition may be suitably adjusted as per the requirement. The present application may comprise a kind of removable ink or permanent ink can be acquired by increase or decrease mass loading of the resin and the amount of resin incorporated in the conductive ink may range from 1% weight by weight to preferably 3% weight by weight to more preferably 5% weight by weight.

In an embodiment, the present application may relate to composition of conductive ink for forming conductive trace on a paper substrate, wherein said water-based resin may comprise one or more selected from amongst aldehyde ketone resin, polyacrylic acid (PAA), acrylic acid resin (AA), epoxy such as Araldite 506 epoxy resin, phenol-formaldehyde resin, polyvinyl alcohol (PVA), polyvinylidene difluoride (PVDF) and polyvinylpyrrolidone (PVP) at a concentration of at least 1%, preferably at least 3% and more preferably at least 5%.

In one embodiment, the present application may relate to composition of conductive ink for forming conductive trace on a paper substrate wherein the conductive ink composition may additionally comprise a surfactant for efficient formulation of said conductive ink composition. Surfactants may be used to dissolve the conductive silver micro particles since the commercial silver flake cannot be dissolved in the water directly. the present application may comprise one or more surfactants selected from amongst disodium monolauryl sulfosuccinate (DLS), disodium laureth sulfosuccinate (MES), disodium cocoyl monoethanolamide sulfosuccinate (DMSSDCMS), sodium dodecyl sulfate (SDS) or sodium lauryl sulfate (SLS), soap of fatty acid potassium (SFP), and BYK series.

In an embodiment, of the present application may relate to composition of conductive ink for forming conductive trace on a paper substrate, wherein said surfactants are added by less than preferably at an amount of less than 5% weight by weight of the conductive ink composition and more preferably at an amount of less than 3% weight by weight of the conductive ink composition.

In one embodiment, the present application may relate to composition of conductive ink for forming conductive trace on a paper substrate wherein the composition may additionally comprise a thickener used in ink which may help to prevent the silver particle from sedimentation and may help to achieve the viscosity suitable for a roller ball pen. It's better to choose one of the thickeners that may increase the thixotropic property of the ink. Due to the high mass loading of the silver flake, the ink is expected to show high viscous property in static condition, on the contrary, when the ink is under use, the ink will be expected to show good fluidity which will let user have a better experience with the writing devices. It may be a feature of the present application to select a thickener which may not affect conductivity of the formulated ink even when used in combination with the silver microparticles or flakes in an aqueous ink. The present application may comprise use of thickeners including but not limited to biological gums, e.g. *Cyamopsis tetragonoloba* gum, *Xanthomonas* polysaccharide and carrageenan gum, sodium alginate; cellulose, e.g. carboxy methyl cellulose (CMC), hydroxyethyl cellulose (HEC), hydroxypropyl methyl cellulose (HPMC) or carboxymethyl cellulose.

In an embodiment, the present application may relate to composition of conductive ink for forming conductive trace on a paper substrate wherein the biological gum is the preferred thickener of choice due to stable rheological property under static status and good fluidity performance under dynamic status, which is called shear thinning behaviour. Inks formulated with these thickeners can be smoothly delivered to paper substrates by writing devices. The present application may use a thickener in the conductive ink composition at a concentration of less 5% weight by weight of the ink composition, preferably at less than 3% weight by weight of the ink composition and more preferably at a concentration of less than 1% weight by weight of the ink composition.

In one embodiment, the present application may relate to composition of conductive ink for forming conductive trace on a paper substrate, wherein water is used as the main solvent of the writable conductive ink. The ink may be mainly formulated with 30 to 60% weight by weight of the conductive ink composition to promote the safety of the ink and make it safe, non-toxic particularly for use by children.

In a preferred embodiment, the present application may comprise of a conductive ink composition for producing a conductive trace on a suitable paper substrate, wherein the said conductive ink composition has the following properties:

| PARAMETER | PROPERTIES |
| --- | --- |
| Solids (%) - amount of conductive metal microparticles | 15~50% w/w |
| Viscosity (cP) | 100~10000 (@20 rpm) (under 25° C.) |
| Main solvent | Water |
| Shelf Life (months) | At least 12 months and preferably 24 months |
| Suitable substrates | Copy paper, photo paper, PET, FPC, plastic surface |
| Resistivity (Ω · cm) | 1~3/write with gel pen; (adjustable) |
| Adhesion | Adjustable |
| Curing Temperature (° C.) | 25 |
| Drying time (s) | Less than 30 seconds |

In one embodiment, the present application relates to composition for conductive ink wherein said ink may be a water-based conductive ink and may comprise of non-toxic conductive particle, water, edible level thickener, surfactant and optionally dispersant resin, making said composition a highly safe conductive ink.

In another embodiment, the present application relates to composition for conductive ink wherein said ink may be a water-based conductive ink which may comprise cost effective micro-sized silver particles or flakes with a size in the range of 1-15 µm enabling easy market access and large-scale availability.

In another embodiment, the present application relates to composition for conductive ink wherein said ink may be a water-based conductive ink which may comprise an edible biological gum or cellulose is used as thickener to improve the rheological properties of the conductive trace and which may further comprise a dispersant resin whose amount may be suitably adjusted to make said conductive ink composition removable or un-removable from smooth surface of the substrates for a plurality of applications.

In yet another embodiment, the present application relates to composition for conductive ink wherein said ink may be a water-based conductive ink which may comprise highly stable, non-toxic, environment friendly, water-based composition for conductive ink to form a conductive trace on a suitable surface, wherein said composition may be free from nano-particles, may comprise mass loading of large silver microparticles having size preferably greater than 9 micrometers and preferably in an amount more preferably in the range of 15% to 50% weight by weight of the composition, may comprise a water at an amount of at least 30 to 60 weight percent of the total conductive ink composition and wherein said composition may be adjusted from inerasable to erasable by change amount of said water-based resin.

Some exemplary embodiments of the said composition for conductive ink for formation of a conductive trace on a suitable substrate and their results have been presented below:

Example 1

A water-based conductive ink formulation is produced by dispersing 25% by weight silver microparticles (average size 9-15 microns) using hydroxyethyl cellulose (HEC) as a thickener at a mass loading concentration of 0.5 wt % and ethylene glycol as a solvent at a concentration of 25 wt % and keeping the final water concentration at 46.5 wt %. Further, BYK190 is added as a surfactant at a loading rate of 3 wt %. The conductive silver ink is thoroughly mixed up to a viscosity ratio from 1 rpm to 10 rpm of approximately 3.1 rpm. The ink is deposited onto a substrate (paper) and dries rapidly at room temperature to form a silver trace. Upon drying, the silver trace is observed to have a resistivity of 3 Ω·cm and appears to have a metallic appearance.

Example 2

A water-based conductive ink formulation is produced by dispersing 25% by weight silver microparticles (average size 9-15 microns) using terpineol at a mass loading concentration of 3.5 wt % and 2-propanol as a solvent at a concentration of 23 wt % and keeping the final water concentration at 43.5 wt %. Further, polyacrylic acid is added at a loading rate of 5 wt %. The conductive silver ink is thoroughly mixed up to a viscosity ratio from 1 rpm to 10 rpm of approximately 2.9 rpm. The ink is deposited onto a substrate (paper) and dries rapidly at room temperature to form a silver trace. Upon drying, the silver trace is observed to have a resistivity of 3.1 κ·cm and appears to have a metallic appearance.

Example 3

A water-based conductive ink formulation is produced by dispersing 18% by weight silver microparticles (average size 9-15 microns) using carboxy methyl cellulose (CMC) as a thickener at a mass loading concentration of 0.5 wt % and 2-propanol as a solvent at a concentration of 25 wt % and keeping the final water concentration at 54.5 wt %. Further, sodium dodecyl sulfate (SDS) is added as a surfactant at a loading rate of 2 wt %. The conductive silver ink is thoroughly mixed up to a viscosity ratio from 1 rpm to 10 rpm of approximately 3.5 rpm. The ink is deposited onto a substrate (paper) and dries rapidly at room temperature to form a silver trace. Upon drying, the silver trace is observed to have a resistivity of 3.5 Ω·cm and appears to have a metallic appearance.

What is claimed is:

1. A composition for a conductive ink, comprising:
a solvent;
conductive particles free from any nanoparticles, wherein the conductive particles further comprise one or more metals;
an edible thickener;
a surfactant; and
water in the range of 30%-60% weight by weight of the composition, wherein said composition comprises a dispersant comprising a water-based resin having concentration in a range of 1% to less than 5% weight by weight of the composition wherein the water-based resin comprises one or more compounds selected from a group consisting of aldehyde ketone resin, epoxy, phenol-formaldehyde resin and polyvinylidene difluoride (PVDF), and wherein the water-based resin having the concentration in the range of 1% to less than 5% weight by weight of the composition makes the conductive ink erasable.

2. The composition of claim 1, wherein the conductive particles comprise one or more particles selected from the group consisting of silver, copper, gold, carbon and any other conductive metal alloy particles.

3. The composition of claim 1, wherein the conductive particles have a size in a range of 1 to 15 micrometers and are added at a concentration in a range of 15% to 50% weight by weight of the composition.

4. The composition of claim 1, wherein the solvent is water-based and nontoxic, and wherein the solvent comprises a glycol selected from one of ethylene glycol, diethylene glycol, and triethylene glycol, or a propanol selected from one of 2-propanol and methoxy-propanol, an ether selected from one of ethylene glycol monomethyl ether, triethylene glycol monomethyl ether, and propylene glycol monomethyl ether, an acetate selected from one of methyl acetate, ethyl acetate, and butyl acetate, or any combinations thereof.

5. The composition of claim 4, wherein concentration of the solvent is less than 30% weight by weight of said composition.

6. The composition of claim 1, wherein the edible thickener is water-based, and wherein the edible thickener further comprises one or more of a biological gum, sodium alginate and cellulose, wherein the biological gum comprises one or more selected from the group consisting of *Cyamopsis tetragonoloba* gum, *Xanthomonas* polysaccharide and carrageenan gum, and wherein the cellulose comprises one or more selected from the group consisting of carboxy methyl cellulose (CMC), hydroxyethyl cellulose (HEC), hydroxypropyl methyl cellulose (HPMC), and carboxymethyl cellulose, and wherein the thickener functions as a thickener, an adhesion promoter and a thixotropic agent, and wherein the thickener has a concentration in a range of less than 1% to less than 5% weight by weight of the composition.

7. The composition of claim 1, wherein said dispersant comprises a water-based, adhesion promoter resin.

8. The composition of claim 1, wherein the surfactant comprises one or more compounds selected from a group consisting of disodium monolauryl sulfosuccinate (DLS), disodium laureth sulfosuccinate (MES), disodium cocoyl monoethanolamide sulfosuccinate (DCMS), sodium dodecyl sulfate (SDS), sodium lauryl sulfate (SLS), and soap of fatty acid potassium (SFP), wherein the surfactant has a concentration of less than 5% weight by weight of said composition.

9. The composition of claim 1, wherein the composition has a shelf life of at least 24 months, and wherein said composition has a viscosity of 100-10000 cP under 25° C.

10. The composition of claim 3, wherein the composition is used in a number of writing devices including gel pen, ball point pen, ink pen, or brushes for writing on a plurality of substrates, and wherein, said writing forms one or more conductive traces comprising uniform percolation network at room temperature without any curing process.

11. A conductive trace formulation comprising:
a water-based conductive ink, said ink comprising, a solvent, conductive particles comprising one or more metals, an edible thickener, a surfactant, water in the range of 30%-60% weight by weight of the composition, and a dispersant comprising a water-based resin having concentration in a range of 1% to less than 5% weight by weight of the composition, wherein the water-based resin comprises one or more compounds selected from a group consisting of aldehyde ketone resin, epoxy, phenol-formaldehyde resin and polyvinylidene difluoride (PVDF), and wherein the water-based resin having the concentration in the range of 1% to less than 5% weight by weight of the composition makes the conductive ink erasable, and wherein the ink is provided in a writing device and said writing device is moved over a surface comprising one or more flexible substrates to form said conductive trace.

12. The conductive trace formulation of claim 11, wherein the conductive particles comprise one or more of silver, copper, gold, carbon or any other conductive metal alloy particles and wherein the conductive particles have a size in the range of 1 to 15 micrometers and are present at a concentration in the range of 15% to 50% weight by weight of said ink.

13. The conductive trace formulation of claim 11, wherein concentration of the solvent is less than 30% weight by weight of said composition.

14. The conductive trace formulation of claim 11, wherein the flexible substrate is one of copy paper, photo paper, polyethylene terephthalate (PET), flexible printed circuit (FPC), plastic, and metal substrate.

15. The conductive trace formulation of claim 11, wherein the resistivity of said conductive trace written by said writing devices is in the range of 0.5 to 30 Ω·cm depending on different substrates and wherein said conductive trace can load at least 6 A current flow depending on different substrates.

16. The conductive trace formulation of claim 11, wherein said conductive trace is capable of being converted from erasable to inerasable by adjusting the amount of said water-based resin.

17. The conductive trace formulation of claim 11, wherein said conductive trace is cured at room temperature without necessity of additional or external heat.

* * * * *